Patented July 18, 1939

2,166,119

UNITED STATES PATENT OFFICE 2,166,119

INSECTICIDE

Euclid W. Bousquet, Wilmington, Del., assignor to E. I. du Pont de Nemours & Company, Wilmington, Del., a corporation of Delaware No Drawing. Application October 3, 1936, Serial No. 103,909

10 Claims. (Cl. 167—24)

This invention relates to compositions of matter which are useful as insect killers, repellents, fly sprays, and the like, and especially to insecticidal compositions containing carboxylic acid amides which have an aliphatic radical of high molecular weight.

Various fatty acid amides of low molecular weight have been used heretofore as emulsifying, wetting, and spreading agents, but they have not, to my knowledge, been successfully employed as ingredients of insecticidal compositions. Attempts have been made to impart insecticidal properties to such relatively low molecular weight amides through replacement of oxygen by sulfur and through introduction of mercury into the molecule, but objectionable properties such as low solubility, unpleasant odor, or lack of toxicity resulted. Solubilizing substituent radicals, such as sulfonic acid groups have been introduced into certain carboxylic acid amides but the resulting compounds, although rendered more useful as wetting or spreading agents, have not to my knowledge been made employable as insecticides. Heretofore, the important insecticidal properties of amides having high molecular weight aliphatic hydrocarbon residues has not been appreciated, and it has not been recognized, in so far as I am aware, that carboxylic acid amides having eight or more aliphatic carbon atoms are toxic and/or repellent to lower forms of life, such as flies.

It is an object of the present invention to provide new and improved insecticides. Another object is to provide toxic substances which will increase the effectiveness of other insecticides. A further object is to provide toxic substances which can be used with other insecticides to provide compositions having a higher insecticidal efficiency than either constituent alone. These and other objects will be apparent from the following more detailed description.

I have discovered that carboxylic acid amides containing at least eight aliphatic carbon atoms, when applied to insects either alone or in conjunction with other compounds have a remarkable insecticidal effect. These amides may be represented more accurately by the general formula

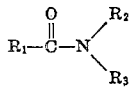

in which $R_1$, $R_2$ and $R_3$ are selected from the group consisting of hydrogen and aliphatic hydrocarbon radicals, and in which at least one of the R's has at least eight carbon atoms. Any of the hydrocarbon radicals represented by an R may be saturated, unsaturated, straight chain, branched chain, or cycloaliphatic.

In general, the amides with which this invention is concerned may be prepared by the reaction of amines or ammonia with acid chlorides, esters, or acids, the groups being selected and combined so as to result in an amide having the indicated general formula. These methods are illustrated in the following examples by descriptions of the preparation of the isobutylamide of undecylenic acid, a compound which to my knowledge was not heretofore known. I have found this compound to be particularly effective as an insecticide. It is to be understood that any of the other amides embraced within the scope of this invention may be made by methods like or similar to those depicted in the examples.

Example I

A mixture of 184 parts of undecylenic acid (10–11 undecylenic acid), prepared by pyrolysis of castor oil, and 87 parts of isobutylamine was heated at 150° C. for 8 hours in a sealed container which was capable of withstanding the pressure which developed. The container may be made of Monel metal, steel, stainless steel, or glass. After heating, the reaction mixture was cooled, the vessel opened and the contents washed first with water and then with aqueous sodium carbonate until neutral. This crude product was next subjected to distillation and the isobutylamide of 10,11-undecylenic acid collected in 75% yield as the colorless oily fraction boiling at 158–160° C. at 2 mm. This amide was found to have the following properties: Melting point 24–25° C., refractive index $$N_D^{25°C.} 1.4581$$

and iodine number 102 (theoretical 106.4). Upon analysis it was found to have a nitrogen content of 5.77% as compared to the calculated value of 5.86%.

Example II

A solution of 27.5 parts of the acid chloride of 10,11-undecylenic acid in 60 parts of benzene was slowly added to a rapidly stirred mixture of 10 parts of isobutylamine, 30–40 parts of benzene, and 68 parts of 10% aqueous sodium hydroxide. The temperature during addition of the acid chloride solution was maintained below 50–60° C. The reaction was continued for one-half hour after mixture of the reagents was complete. The benzene solution was then separated and after washing with water until neutral, it was subjected to distillation to isolate the pure amide.

Example III

A still further procedure for making the isobutylamide of 10,11-undecylenic acid consists in the treatment of an ester of 10,11-undecylenic acid, such as the ethyl ester, with isobutylamine. This process is preferably carried out under conditions described in Example I except that the reagents are heated at ordinary pressures. The reaction is slower at ordinary pressures but is feasible.

A number of amides which are typical of those within the scope of this invention are given in Table I in which exemplary methods of preparation are also indicated.

centrations of the most effective amides, such as the isobutylamide of undecylenic acid can be used, for example, as low as about 0.01%. Low concentrations are preferred where the toxicity of the amide is sufficiently high both from considerations of cost and also for the reason that the possibility of a residue is minimized when the

Table I

| Amide | Method of preparation | Physical constants | Percent nitrogen | |
|---|---|---|---|---|
| | | | By analysis | Calculated |
| Isobutylamide of octanoic acid | Example II | B. P. 158-160° C./2 mm | 6.86 | 7.03 |
| Isobutylamide of decanoic acid | do | B. P. 170° C./3 mm | 5.71 | 6.17 |
| Isobutylamide of undecanoic acid | do | M. P. 49-51° C | 5.50 | 5.80 |
| Isobutylamide of lauric acid | do | M. P. 50-51° C | 5.48 | 5.49 |
| Isopropylamide of 10,11-undecylenic acid | do | B. P. 158-160° C./2 mm | 6.19 | 6.22 |
| Isobutylamide of oleic acid * | Example I | M. P. 20-27° C | 4.52 | 4.15 |
| Isobutylamides of China-wood oil acids | Example III | M. P. 30-35° C | 4.23 | 4.20 |
| Isobutylamides of castor oil acids | do | M. P. 30-35° C | 3.69 | 3.97 |
| Isobutylamides of naphthenic acids | Example I | B. P. 135-170° C./1 mm | 6.00 | 6.11 |
| Isobutylamides of acids obtained by oxidation of petroleum hydrocarbons | Example II | B. P. 110-178° C./2 mm | 6.44 | 6.82 |
| Isobutylamide of ethyl-n-heptylacetic acid | do | B. P. 154-155° C./2 mm., M. P. 26-27° C. | 5.61 | 5.71 |
| Isobtylamide of n-butyl-n-amylacetic acid | do | B. P. 148-150° C./2 mm | 5.72 | 5.81 |
| Dodecylamide of isobutyric acid | Example I | B. P. 168-172° C./4 mm | 5.52 | 5.49 |

* Iodine number: found, 76.8; calculated, 75.4.

As illustrative of other amides which may be used alone or in preparing insecticidal compositions in accordance with the present invention are mentioned dimethylamide of lauric acid, the n-dodecylamide of lauric acid, the amide of lauric acid, the n-dodecylamide of formic acid, the isobutylamide of di-n-heptylacetic acid, and the isobutylamide of ethyl-n-butylacetic acid. Mixtures of amides may be used, for example, the isobutylamides of linseed, olive, coconut, or China-wood oil acids, and the isobutylamides of the acids obtained by oxidizing the mixture of alcohols of eight or more carbon atoms produced in the catalytic hydrogenation of the carbon oxides. The mixtures of fatty oil acid amides may be obtained by heating the oil or fat with ammonia or amines at superatmospheric pressures. Other butyl amides are made by similar processes and they are similarly effective.

In preparing insecticidal compositions, at least one amide of the foregoing general formula is used. The amide is generally, though not necessarily, employed in conjunction with one or more other liquid, semi-liquid or solid insecticidal or non-insecticidal substance or carrier, such as a substance of the type commonly used in formulating insecticidal compositions. A few such substances or carriers are mentioned as typical: kerosene, gasoline, pyrethrum, derris, talc, thiocyanates, phthalates, and pine oil. The resulting composition may be a liquid a semi-liquid or a comminuted solid as needed and desired by appropriate selection of the amide and/or the carrier. The compositions may be used generally for the purpose of pest control and the destruction of lower forms of life. They may, for instance, effectively be used as fly sprays for which purpose they are particularly useful. They may also be used as stomach poisons for leaf-eating insects, and as contact insecticides for sucking insects.

Fly sprays containing the amides described herein may be made simply by dissolving the amide in kerosene or other petroleum product in which the amides have as a rule a good and sufficient solubility. Concentrations from about 0.1% to about 5.0% are satisfactory although larger amounts may be used if desired. Even lower concompositions are used on materials, such as fabrics where residues are sometimes objectionable. However, the residue from volatile compositions of the invention is not a serious consideration since the amides used therein have, as a rule, little or no perceptible odor at higher concentrations and are almost non-volatile at ordinary temperatures and pressures.

In general, the amides in which $R_1$ of the general formula has from seven to eleven carbon atoms are preferred because of their great toxicity, low volatility, slight odor, high solubility, and high synergistic power. Of these amides, those in which $R_2$ is a butyl group, such as isobutyl are particularly effective and are preferred, for example, in fly sprays. Reference is made in this connection to Table II below.

The following examples are given to illustrate typical insecticidal compositions embraced within the scope of this invention:

Example IV 0.25% by weight of the amide of 10,11-undecylenic acid was dissolved in kerosene. The solution was an effective insecticidal spray, for example, when used as a fly spray. The amide was practically odorless when used in the indicated amount. No objectionable residue remained after repeated use. The toxicity of the composition when sprayed on flies equaled in some cases and exceeded in others the toxicity of a pyrethrum extract containing 125 mg. of the pyrethrins per 100 cc. of kerosene.

Example V

About 0.5% of the isobutylade of 10,11-undecylenic acid was dissolved in kerosene. The toxicity of this composition was greater than the toxicity of the composition described in Example IV and it was odorless.

Example VI

About 1.0% of the mixture of isobutylamides from coconut oil acids was dissolved in kerosene. These acids were principally eight, ten, and twelve aliphatic carbon atoms acids. The composition was a slightly more effective insecticide than the composition of Example IV, especially when used for longer periods of contact. The amides were readily soluble in kerosene and they produced small and non-odorous residues.

*Example VII*

A dusting composition containing about 90% of talc and 10% of the isobutylamide of 10,11-undecylenic acid was made by mixing together the dry ingredients. When the dust was applied to foliage, it was found that it gave a higher kill of Mexican bean beetles than did lead arsenate.

Table II indicates the remarkable toxicity of the amides when they are used with kerosene in the amounts indicated. The table shows the effect of the compositions on flies as compared with the effect of a standard pyrethrum-kerosene extract containing 125 mg. of pyrethrins per 100 cc. of kerosene. The concentration is expressed in terms of percentage by weight and the numbers represent the relative effect is compared to a standard pyrethrum insecticide, the standard and the tested insecticides being applied under like conditions for the length of time indicated. The test were conducted in accordance with the standard Peet-Grady specification.

*Table II*

| Compound | Percent concentration | Relative efficiency | |
|---|---|---|---|
| | | 10 mins. | 24 hrs. |
| | | Percent | Percent |
| Isobutylamide of 10,11-undecylenic acid | 0.25 | 92 | 108 |
| Do | 0.5 | 92 | 111 |
| Do | 1.0 | 97 | 118 |
| Isobutylamide of lauric acid | 0.25 | 87 | 96 |
| Do | 0.5 | 90 | 111 |
| Do | 1.0 | 92 | 107.8 |
| Isobutylamide of capric acid | 0.25 | 87 | 100 |
| Do | 0.5 | 90 | 104 |
| Do | 1.0 | 81 | 110 |
| n-Butylamide of 10,11-undecylenic acid | 0.25 | 96 | 97 |
| Do | 1.0 | 97 | 116 |
| Amide of 10,11-undecylenic acid | 0.25 | 93 | 91 |
| Mixture of isobutylamides of octanoic, decanoic, and lauric acids (from coconut oil acids) | 0.25 | 94 | 88 |
| Do | 1.0 | 95 | 112 |

Table III illustrates the remarkable synergistic value of the amides of this invention. This table shows the relative efficiency of pyrethrum extract alone in kerosene as compared to the combination of pyrethrum extract and the isobutylamide of 10,11-undecylenic acid in kerosene. The results are expressed in terms of percentage of the values obtained by comparison with a standard pyrethrum spray containing 125 mg. of pyrethrins per 100 cc. of kerosene or 0.125%. These tests were applied to flies and conducted in accordance with the standard Peet-Grady specifications.

*Table III*

| Compound | Concentration | 10 min. down | 24 hr. kill |
|---|---|---|---|
| | | Percent | Percent |
| Pyrethrum extract alone in kerosene | Percent 0.025 | 86.4 | 48.4 |
| Pyrethrum extract and the amide} in kerosene | { 0.025  0.5 } | 97.0 | 103.0 |

It is to be understood that other amides of the type described have insecticidal properties, and other compositions beside those specifically mentioned are contemplated and are within the scope of this invention. When used in conjunction with other substances, the compositions may contain other liquid or dry substances than those mentioned, and various proportions thereof may be used. The insecticidal compositions may contain non-insecticidal or other insecticidal substances as carriers. As still other modifications of the invention may be made, no limitations to the annexed claims are intended except those which are specifically recited or are imposed by the prior art.

I claim:

1. An insecticidal composition comprising kerosene and the isobutylamide of 10,11-undecylenic acid.

2. An insecticidal composition comprising as an essential toxic ingredient an amide represented by the formula

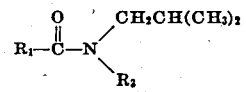

in which $R_1$ is an aliphatic hydrocarbon radical having from seven to eleven carbon atoms, and $R_3$ is chosen from the group consisting of hydrogen and aliphatic hydrocarbon radicals.

3. An insecticidal composition comprising as an essential toxic ingredient an amide represented by the formula

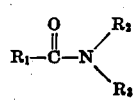

in which $R_1$ is an aliphatic hydrocarbon radical having from seven to eleven carbon atoms, and $R_2$ and $R_3$ are chosen from the group consisting of hydrogen and aliphatic hydrocarbon radicals.

4. An insecticidal composition comprising as an essential toxic ingredient an amide represented by the formula

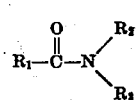

in which $R_1$, $R_2$ and $R_3$ are selected from the group consisting of hydrogen and aliphatic hydrocarbon radicals, at least one of the R's having at least eight carbon atoms.

5. The monoisobutylamide of 10,11-undecylenic acid characterized as a colorless, oily material boiling at 158–160 degrees C. at 2 mm. and melting at 24–25 degrees C. having insecticidal properties.

6. An insecticidal composition containing as an essential toxic ingredient the isobutylamide of 10,11-undecylenic acid.

7. A process for the control of insect pests comprising spraying the insects with a solution of the isobutylamide of 10,11-undecylenic acid.

8. An insecticidal composition containing as an essential toxic ingredient a butyl amide of 10,11-undecylenic acid.

9. A process for the control of insect pests comprising spraying the insects with a solution of a butyl amide of 10,11-undecylenic acid.

10. An insecticidal composition comprising an amide represented by the formula

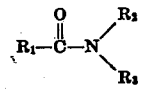

in which $R_1$, $R_2$ and $R_3$ are selected from the group consisting of hydrogen and aliphatic hydrocarbon radicals, at least one of the R's having at least eight carbon atoms and a hydrocarbon solvent.

EUCLID W. BOUSQUET.